United States Patent [19]
Youman et al.

[11] Patent Number: 5,904,034
[45] Date of Patent: May 18, 1999

[54] TREE BORNE FRUIT HARVESTER

[75] Inventors: Marty Dean Youman, Madera; Phillip Ray Scott, Coarsegold; Dennis R. Schultz, Madera, all of Calif.

[73] Assignee: AG-Right Enterprises, Madera, Calif.

[21] Appl. No.: 08/902,394

[22] Filed: Jul. 29, 1997

[51] Int. Cl.⁶ .................................................. A01D 46/00
[52] U.S. Cl. .................... 56/328.1; 56/329; 56/340.1; 56/330
[58] Field of Search .................... 56/328.1, 329, 56/330, 331, 340.1

[56] References Cited

U.S. PATENT DOCUMENTS

| | | |
|---|---|---|
| 3,413,789 | 12/1968 | Studer . |
| 3,522,696 | 8/1970 | Millier et al. . |
| 3,555,799 | 1/1971 | Gerrans ................................... 56/340.1 |
| 3,656,287 | 4/1972 | Morrison et al. ....................... 56/340.1 |
| 3,668,849 | 6/1972 | Bunker .................................. 56/400.17 |
| 3,705,486 | 12/1972 | Chen et al. ............................. 56/328.1 |
| 3,744,226 | 7/1973 | Granger ................................. 56/328.1 |
| 4,077,193 | 3/1978 | Diggs . |
| 4,329,836 | 5/1982 | Scudder . |
| 4,860,529 | 8/1989 | Peterson et al. ........................ 56/328.1 |
| 4,974,404 | 12/1990 | Korthuis et al. ........................ 56/328.1 |
| 5,027,593 | 7/1991 | Korthuis et al. . |
| 5,161,358 | 11/1992 | Crunkelton ............................. 56/328.1 |
| 5,220,775 | 6/1993 | Vogel et al. ............................ 56/328.1 |
| 5,421,149 | 6/1995 | Littau . |
| 5,423,166 | 6/1995 | Scott . |
| 5,660,033 | 8/1997 | Korthuis et al. .......................... 56/330 |
| 5,661,963 | 9/1997 | Scott ..................................... 56/328.1 |

FOREIGN PATENT DOCUMENTS 528905  9/1976  U.S.S.R. .

*Primary Examiner*—Terry Lee Melius
*Assistant Examiner*—Arpad Fabian Kovacs

[57] ABSTRACT

A harvester for tree borne fruit is disclosed wherein a power driven vehicle is provided for following a course adjacent and parallel to a row of fruit trees. The vehicle carries a vibratory brush having tines for engaging and shaking the tree's fruit bearing branches. The brush is yieldably held in engagement with the fruit bearing branches and is adjustable in three aspects, elevation, tilt angle and lateral position, to assume an optimum position relative to the row of trees. A brake is provided to control a net rotation speed of the vibratory brush within the branches. A resilient screen deflects randomly projected harvested fruit toward a harvested fruit catch apparatus. The tines are covered with an optimally designed resilient cover for reducing cullage in the harvested fruit.

14 Claims, 4 Drawing Sheets

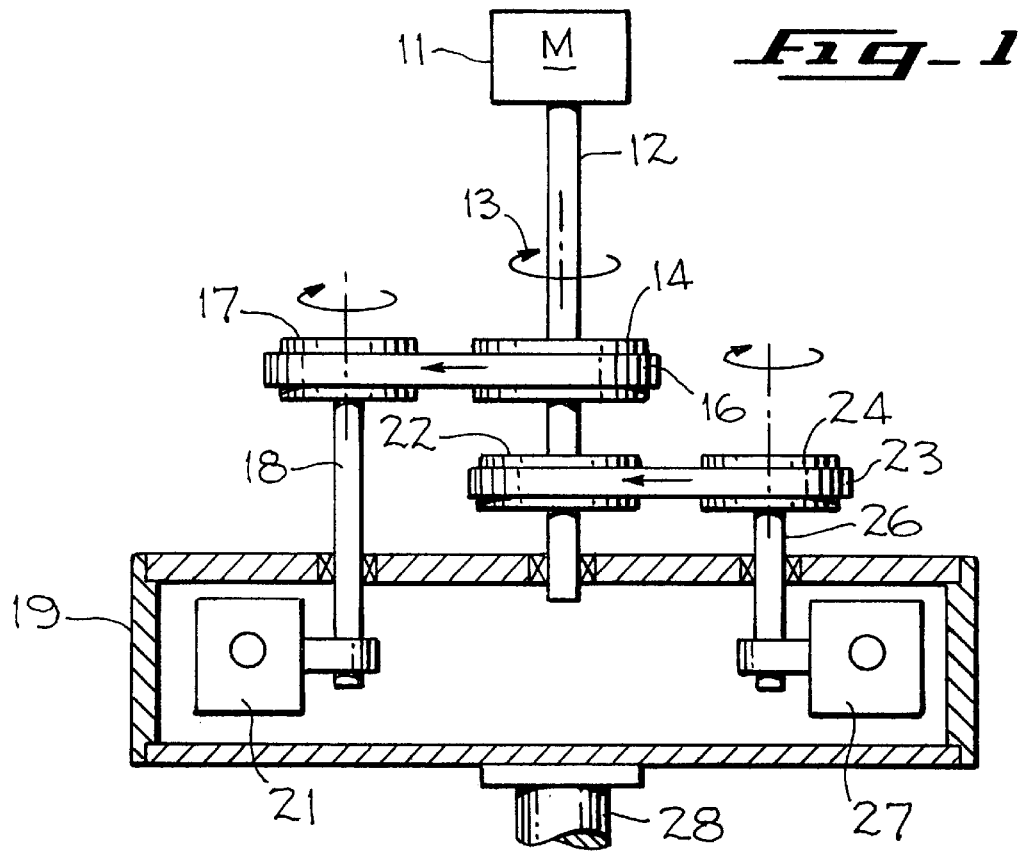
Fig_1
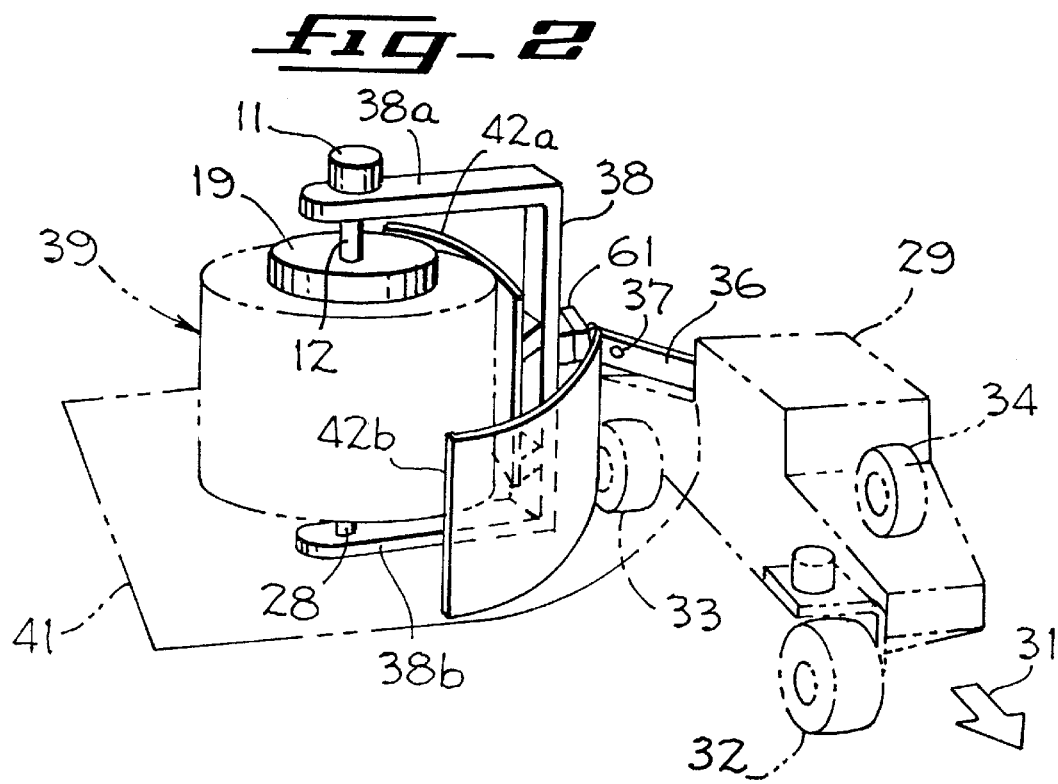
Fig_2

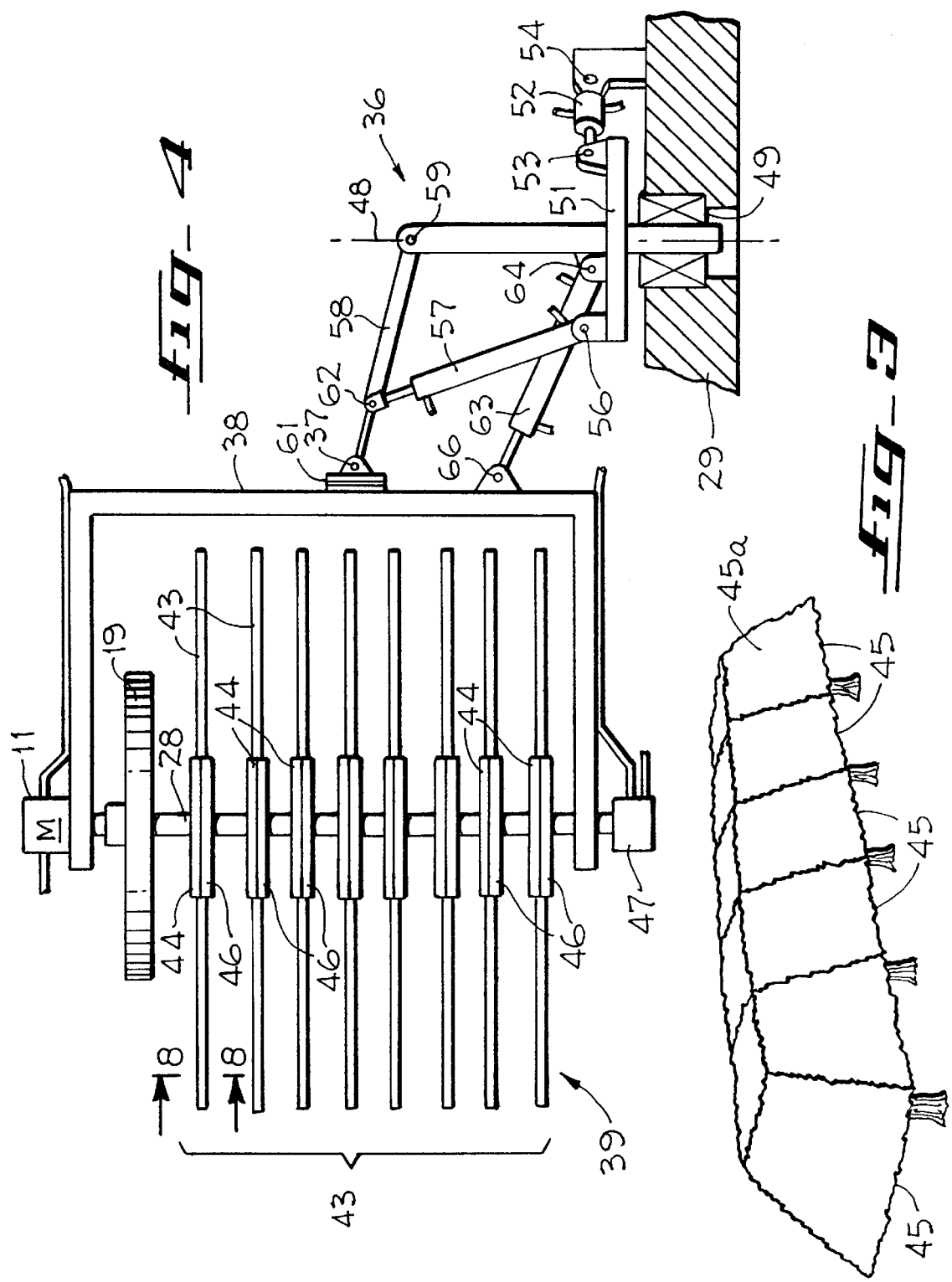

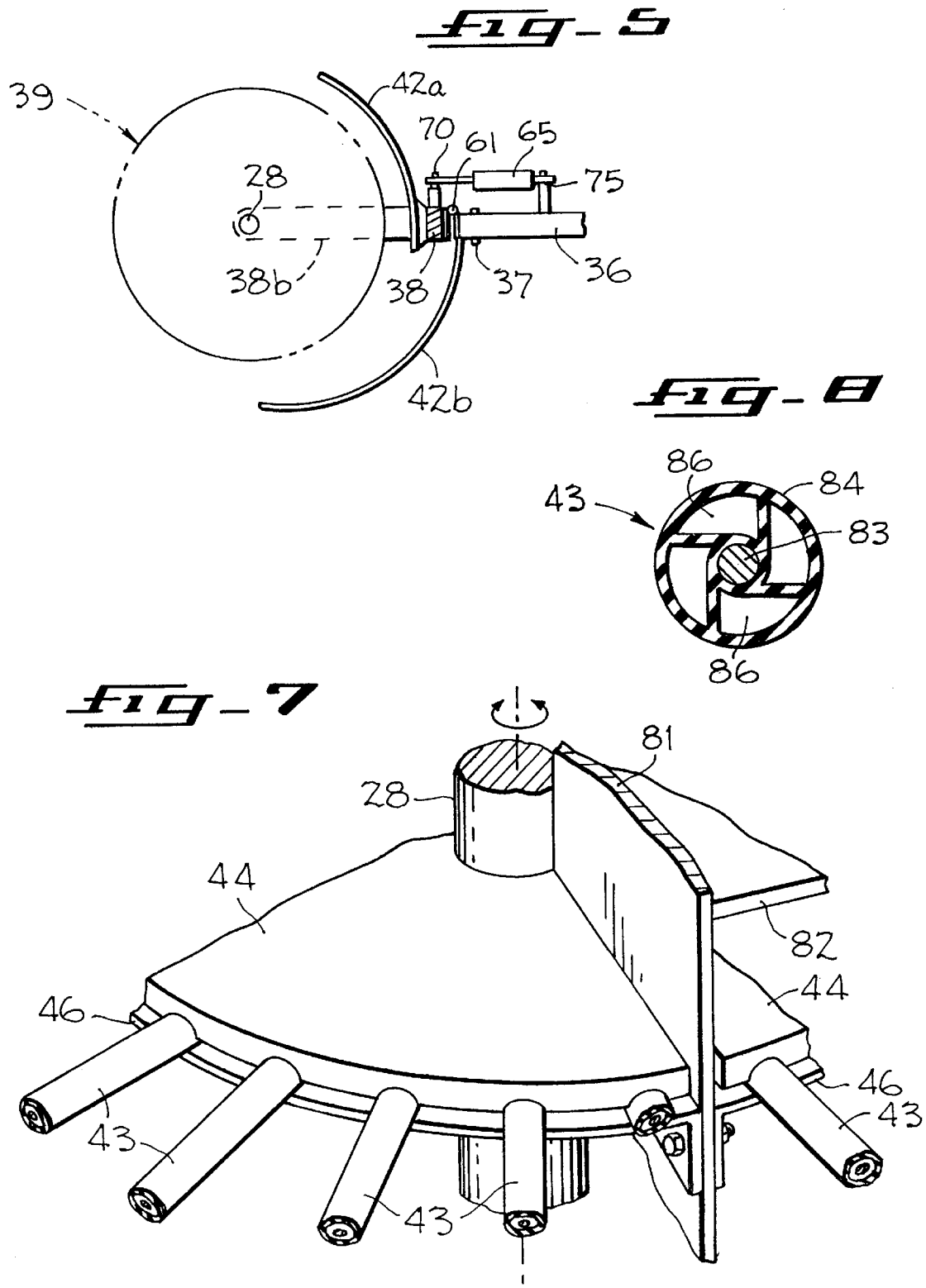

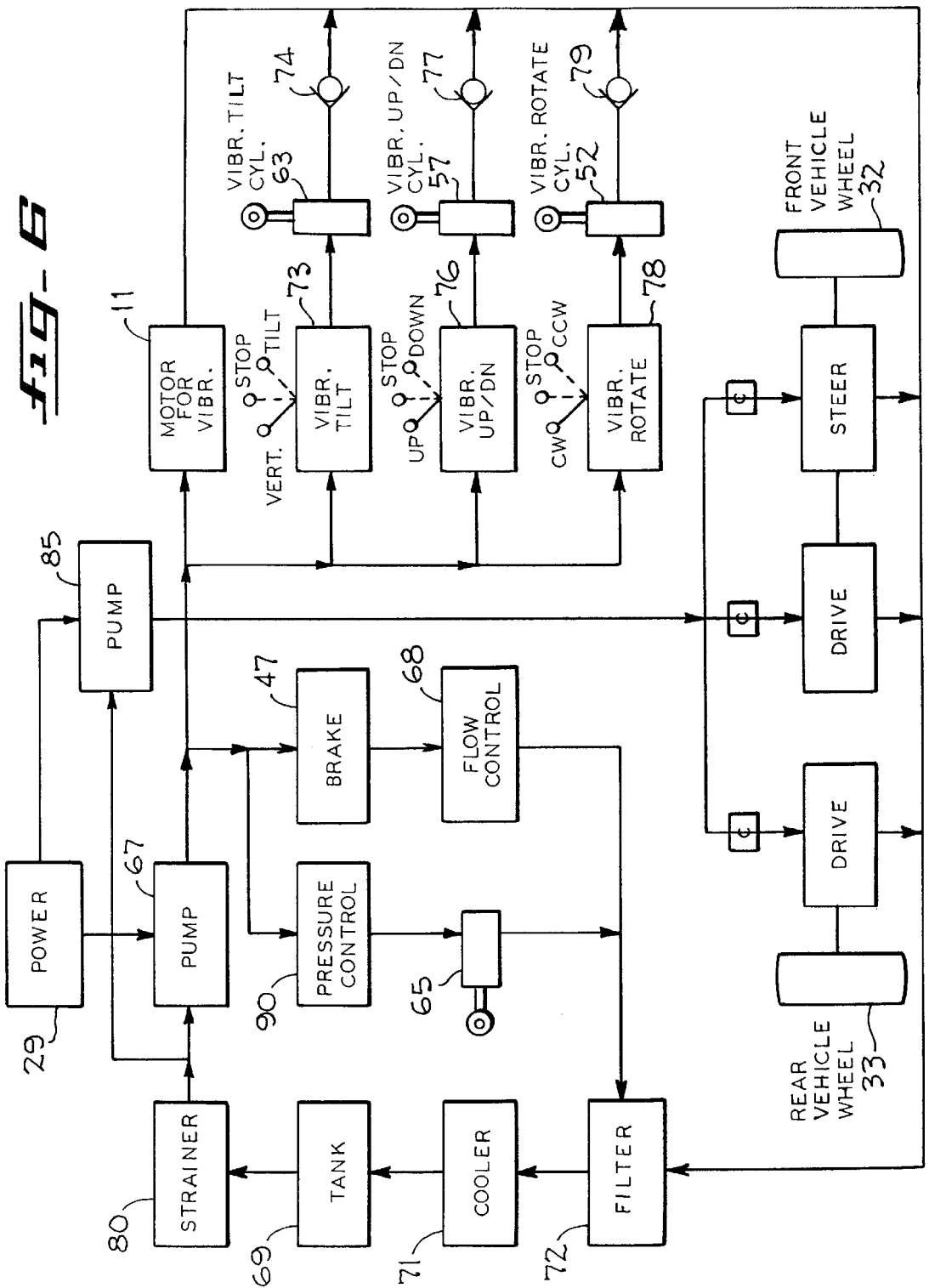

TREE BORNE FRUIT HARVESTER

SUMMARY OF THE INVENTION

A harvester for tree borne fruit is disclosed herein which is mounted on a wheel supported mobile vehicle driven by a contained power source and is driven along a path which is adjacent to a row of fruit bearing trees at a predetermined velocity. A vibration head support frame is included which is mounted on the wheel supported mobile vehicle and a vibration head is mounted on the vibration head support frame. The vibration head has an outside diameter for contacting foliage in the row of fruit bearing trees and is disposed for rotary motion about a head vibration axis. A vibration head drive means is provided which is mounted on the vibration head support frame and is connected to the power source. A vibration means is mounted also on the vibration head support frame and is connected between the vibration head and the vibration head drive means so that the vibration head is driven through an oscillatory amplitude about the head vibration axis. Further, the vibration means imparts a net rotational movement to the vibration head about the head vibration axis. Means is included for raising and lowering the vibration head support frame. Also included is first power means for adjusting the attitude of the head vibration axis relative to vertical. Additionally, second power means is included for adjusting the position of the head vibration axis relative to the course of the mobile vehicle adjacent the row of fruit bearing trees. Braking means is provided for controlling the speed of the net rotational movement of the rotary motion about the vibration axis, whereby the tangential speed of the vibration head outside diameter is controlled.

In another aspect of the invention a harvester is disclosed for tree-borne fruit wherein a mobile vehicle supported by a plurality of ground contacting wheels is driven by a power source along a harvesting path adjacent to a fruit bearing tree. A vibration head support frame is provided along with a vibration head support arm connected at a frame end of the arm to the vibration head support frame and at a vehicle end of the arm to the mobile vehicle. Means is provided for mounting the vibration head support arm for pivotal movement on the mobile vehicle. A vibration head is mounted on the vibration head support frame having a vibration axis. Further, vibration inducing means is mounted on the vibration head support frame connected between the power source and the vibration head, so that the vibration head is driven rotationally in an oscillatory mode about the vibration axis. First power means is connected between the mobile vehicle and the vehicle end of the vibration head support arm for pivoting the support arm toward and away from the harvesting path. Second power means is connected between the vehicle end of the vibration head support arm and the vibration head support frame for tilting the vibration head support frame. Additionally, third power means is connected between the vehicle end of the means for mounting the vibration head support arm and an intermediate position along the vibration head support arm for changing the elevation of the vibration head.

In yet another aspect of the invention a fruit harvesting apparatus is adapted for mounting on a support for removing harvestable fruit from plant foliage. A vibration head is mounted in a head support frame and vibration drive means is connected to the vibration head for inducing oscillatory motion and net rotation movement in the vibration head about a head rotation axis. A plurality of flexible pultrusions extend radially from the rotation axis and are secured in position about the rotation axis by a vibration head hub. Braking means is disposed about the rotation axis to control the speed of the head net rotation. Each pultrusion has a resilient cover lying along its length with a plurality of cavities in the cover to increase the yield in the harvestable fruit contacting surfaces of the pultrusions.

DESCRIPTION OF THE DRAWINGS

FIG. 1 is an elevation partly in section of one type of vibration inducing mechanism for use in the present invention.

FIG. 2 is a perspective, partially in phantom line, of the driven mobile vehicle carrying a vibration head in accordance with the present invention.

FIG. 3 is a perspective of a row of fruit bearing trees in a hedgerow configuration.

FIG. 4 is an elevation of the vibration brush assembly supported in a vibration brush support arm.

FIG. 5 is a plan view of the vibration brush assembly and connection to the vibration brush support arm.

FIG. 6 is a tree fruit harvester hydraulic system schematic utilized in the present invention.

FIG. 7 is a partial view of the structure which secures the tines within the vibration brush assembly of the present invention.

FIG. 8 is a section along the line 8—8 of FIG. 4.

DESCRIPTION OF THE PREFERRED EMBODIMENT

The disclosure herein relates to a novel harvester for tree borne fruit such as olives, citrus fruit, peaches, nuts or cherries, for example. Attention is drawn to the disclosure in U.S. Pat. No. 3,413,789, Studer, for a Vibratory Fruit Harvester. Several embodiments of a vibrator for imparting shaking movement to a tree are disclosed in the Studer '789 patent. These vibration mechanisms are primarily for agricultural use to impart vibration to a tree from which fruit is being harvested. The vibrating mechanism is freely movable about its vibration axis as it moves past the tree. One form of the vibrating mechanism as disclosed by Studer may be seen in the depiction of FIG. 1 in the drawings. A motor 11 drives a shaft 12 rotationally in the direction shown by arrow 13. A gear or toothed member 14 is attached to the shaft 12 and drives a belt 16. The belt 16 is also in contact with a gear or toothed member 17 which is attached to a shaft 18. The shaft 18 is journaled in a case 19 and has an eccentric weight 21 attached to the end thereof opposite the end at which the gear or toothed member 17 is attached.

As may be seen in FIG. 1, the lower end of the shaft 12 is also journaled in the case 19 and has a second toothed member or gear 22 affixed thereto which is similar to the toothed member 14. The shaft 12 drives a second belt 23 through the gear or toothed member 22. The belt 23 is also in contact with a gear or toothed member 24 which is fixed to a shaft 26 journaled in the case 19. The member 24 is similar to the member 17. At the other end of the shaft 26 opposite the position of the toothed member 24 is attached an eccentric weight 27. The case 19 is attached to a vibrator shaft 28. The eccentric weights 21 and 27 are similar and are positioned on their respective shafts 18 and 26 180° out of phase with one another. As seen in FIG. 1, at the instant depicted by the figure, the eccentric weight 21 is traveling into the paper and the eccentric weight 27 is traveling out of the paper. As the two eccentric weights 21 and 27 rotate in synchronism, due to the appropriate selection of toothed members and belts, they remain 180° out of phase with one another and impart an oscillatory motion to the case 19 about the axis of the shaft 12. Consequently, the shaft 28, attached to the case 19 and having a shaft axis colinear with the axis of shaft 12 is also subjected to oscillatory motion about its own axis. It should further be noted that in the simplified example of FIG. 1, the axes of the shafts 12, 18 and 26 lie in a common plane.

In FIG. 2 of the drawings an engine driven vehicle 29 is seen in phantom line which is disposed for forward motion in the direction of arrow 31. The vehicle is a three wheeled vehicle having two driven wheels 32 and 33 on the right side thereof. A single idler wheel 34 is seen (hidden) on the left side of the vehicle which, together with driven wheels 32 and 33, provides for stable contact with an underlying surface supporting the vehicle. Typically, the two driven wheels 32 and 33 are powered by hydraulic motors from a hydraulic system powered by the vehicle engine as will be described later herein. The front driven wheel 32 is also steerable to guide the vehicle 29 left and right of the straight ahead direction indicated by the arrow 31.

A support arm 36 is mounted on the vehicle 29 in a suitable fashion to be hereinafter described. The support arm 36 has pivotally attached thereto at a pivot point 37 a brush support arm 38. The brush support arm 38 has an upper extension 38a on which is mounted the hydraulic motor 11. As described in conjunction with FIG. 1, the motor 11 drives the shaft 12 rotationally causing an oscillatory motion in the case 19 which is attached to the shaft 28 of a vibratory harvesting brush or vibration head 39. The lower end of shaft 28 extends along the axis of and through the vibratory harvesting brush 39 and is journaled in a lower extension 38b of the brush support arm 38. A catch surface 41 is shown in phantom line in FIG. 2 for collecting the harvested fruit from a tree in contact with the vibratory harvesting brush 39. The catch surface 41 may be any one of a variety of configurations, including a tarpaulin spread upon the ground under a tree from which fruit is being harvested, the configuration of the catch surface 41 not being considered a part of the invention described herein.

Also, as seen in FIG. 2, a fruit deflection screen having a rearwardly extending portion 42a and a forwardly extending portion 42b is provided. The rearwardly extending portion 42a is attached to the upright portion of the brush support arm 38 in a position between the vibratory harvesting brush 39 and the engine driven vehicle 29. The purpose of the screen portions 42a and 42b is to deflect fruit which is vibrated loose and may depart from a tree in the direction of the vehicle 29. The deflection screen portions are designed to gently intercept the fruit which may be directed away from the tree without bruising the fruit, thereby allowing it to drop in an undamaged condition onto the catch surface 41. A resilient nylon netting stretched across a framework to form the two screen portions 42a and 42b has been found to serve this purpose and to reduce cullage in the harvested fruit.

The shape of a tree or row of trees will affect productivity in fruit harvesting of the type described herein. The surface of a fruit bearing tree 45 can be pruned to be fairly flat whereby the fruit is produced near the flat surface 45a on the tree as seen in FIG. 3 of the drawings. Moreover, the trees may be grown in a hedgerow configuration within a tree orchard as also shown in FIG. 3, whereby efficiency of harvesting is increased dramatically. The configuration of harvester seen in FIG. 2 is utilized to advantage in fruit bearing tree row arrangements shown in FIG. 3, because in such an instance the harvested fruit tends to fall almost directly downward and is not thrown far horizontally by the shaking action of the vibratory harvesting brush 39. Moreover, as mentioned hereinbefore, the resilient screen portions 42a and 42b direct horizontally projected fruit back toward the catch surface 41 without damaging the fruit when it does not fall almost directly downward. Most fruit which is projected horizontally by the vibration brush 39 is thrown ahead of the vehicle 29. The screen portions 42a and 42b therefore extend around the head 39 more in front than in the rear.

Turning now to FIG. 4 of the drawings, the hydraulic motor 11 is seen mounted on the upper extension 38a of the brush support arm 38 in position to drive the shaft 12 on the vibratory mechanism of FIG. 1 including the case 19. As revealed hereinbefore, the shaft 28 which extends through the vibratory harvesting brush 39 is oscillated so that the harvesting brush is oscillated about the axis of the shaft 28. The shaft 28 has attached thereto a plurality of levels of radially extending tines 43 as illustrated in FIG. 4. The depiction of FIG. 4 shows only those tines extending left and right in the plane of the paper, whereas in actual practice, tines 43 extend radially from positions all around the circumference of the shaft 28 in conformance with the representation of the harvesting brush 39 in FIG. 2. The depiction of FIG. 4 is for producing clarity in the Figure while undertaking a description of the structure of the vibration head or vibratory harvesting brush 39. The radially extending tines 43 are supported by a hub assembly which includes upper and lower holding plates 44 and 46, which in turn are secured to the hub of the vibratory harvesting brush 39. The tines 43 are captured between the upper and lower holding members 44 and 46 and, since the holding members are secured to the harvesting brush hub, tines 43 are thereby also secured thereto. From the foregoing it may be seen that the shaft 28 and therefore the tines 43 of the harvesting brush 39 are free to oscillate relative to the support arm 38 and also to rotate with respect to support arm 38 about the axis of the shaft 28.

Attached to the lower extension 38b of the brush support arm 38 is a hydraulically actuated braking mechanism 47. The braking mechanism imposes a braking action on the rotation of the shaft 28. The vibratory oscillation imposed by the mechanism described in conjunction with FIG. 1, also imposes a net rotational effect on the vibratory harvesting brush 39 which has been observed empirically and which is also mentioned in the Studer '789 disclosure. The net rotational direction is in the direction of rotation of the hydraulic motor 11. The braking mechanism 47 controls this net rotational effect in a beneficial fashion. The braking mechanism has an insignificant effect on the amplitude of the vibration of the tines 43. The frequency of the vibration is determined by the speed of rotation of the motor 11. The speed of the net rotation of the vibration head 39 is controlled by the brake mechanism 47. The speed of net rotation is ideally such that the net rotation speed of the tine tips which are within the foliage of a tree is the same in a rearward direction as the speed of the vehicle in the forward direction indicated by arrow 31.

Looking further at FIG. 4, the support arm 36 is shown in a functional fashion. Structurally the depiction of FIG. 4 for the support arm 36 would not be adequate. However, FIG. 4 is useful to provide a clear explanation of the function and general structure of the support arm 36.

The support arm 36 is attached to the mobile vehicle 29 to pivot about a substantially vertical axis 48. The support arm 36 is free to pivot in a bearing 49. For purposes of this description, a lower support arm plate 51 is shown. A rotation hydraulic cylinder 52 has a rod extending therefrom which is attached at its free end to a point 53 on the periphery of plate 51. The opposing end of the cylinder 52 is attached to a point 54 on the structure of the vehicle 29. Extension and retraction of the rod in the rotation hydraulic cylinder 52 will provide rotational movement of the brush support arm 38 and vibratory harvester brush 39 about the axis 48 (FIG. 4) so that the tines 43 on the vibrator brush may be disposed into and out of the foliage on the trees bearing harvestable fruit. The rotation hydraulic cylinder 52 effectively controls the position of the vibratory harvester brush 39 relative to the course of the mobile vehicle 29 and therefore relative to the fruit bearing trees. It also allows the vibrator head 39 to be placed in a trail position behind the vehicle 29 during transport.

As seen in FIG. 4, attached to a point 56 on the periphery of the support arm plate 51 is an elevation hydraulic cylinder 57 having a rod extending from the cylinder. A member 58 extends from a pivot point 59 on the support arm 36 to the pivot point 37 on the upright portion of the brush support arm 38. The free end of the rod in the elevation hydraulic cylinder 57 is attached to a midpoint 62 of the member 58 extending between the pivot points 59 and 37. It may be seen that extension of the rod from the elevation hydraulic cylinder 57 will cause the brush support arm 38 and therefore the vibratory brush assembly 39 to rise, while retraction will cause the vibratory brush 39 to be lowered.

Further referring to FIG. 4, a tilt hydraulic cylinder 63 is shown attached at one end to a point 64 on the support arm plate 51 and having an extending rod with its free end attached to a pivot point 66 on the brush support arm 38. It may be seen from the positions of the pivot points 64 and 66 that extension of the rod in the tilt hydraulic cylinder 63 will cause the vibratory harvester brush 39 to tilt in a clockwise direction as seen in FIG. 4, while retraction thereof will cause the brush assembly 39 to tilt in a counterclockwise direction. It may thus be seen that the vibratory harvester brush 39 is adjustable in position about one substantially vertical axis 48 and about two substantially horizontal axes through pivot points 59 and 37 for positioning the vibratory brush assembly 39 in an optimum position relative to a fruit bearing tree.

FIG. 5 shows details of the structure connecting the vibration head support frame 38 and the arm 36 which are not described in conjunction with the structural representation of FIG. 4. It should be noted that the attachments of the tilt hydraulic cylinder 63 and its extending rod at points 64 and 66 respectively in FIG. 4 will be ball joint attachments to allow for the motion of brush support arm 38 to be now described by reference to FIG. 5. A hinge member 61 lies between and has its opposing sides attached to the end of arm 36 and the vibration head support frame 38. The hinge member is disposed so that the vibratory harvesting brush 39 may be swung about the hinge axis in a clockwise rotation from the normal position seen in FIG. 5. The rearwardly extending screen portion 42a will rotate with the vibration head support frame 38 and the forwardly extending screen portion 42b will not rotate, being fixed to the end of the arm 36.

A hydraulic cylinder 65 has a rod extending therefrom. The free end of the rod is attached at a point 70 on the vibration head support frame 38 and the opposing end of the cylinder 65 is attached at a point 75 on the arm 36. The piston in the hydraulic cylinder 65 is about two inches in diameter and hydraulic pressure is metered at some predetermined pressure level to the cylinder 65 in the range of about 300 to 100 PSI. Therefore an external force on the end of the piston rod in the range of about 900 to 300 pounds would be required to cause the rod to retract within the cylinder 65. A pressure within cylinder 65 in the aforementioned range is set, according to the existing harvesting circumstances, and the resulting retraction resisting force at the rod of cylinder 65 must be overcome by force on the vibratory harvesting brush assembly 39 for the vibration head support frame 38 to be forced in the clockwise direction in FIG. 5. The resisting force biases the vibratory harvesting brush assembly 39 into the foliage of the trees being harvested and force exceeding the biasing force moves the harvesting brush out of the way (clockwise) and avoids tree limb breakage and mechanical injury to the harvesting brush assembly components.

Turning now to FIG. 6 of the drawings, a hydraulic system for driving the various components in the current invention is shown. Power is provided from the power source carried on the mobile vehicle 29 to a pump 67 which provides hydraulic pressure for the brake 47. A flow control valve 68 controls the application of the brake 47 and hydraulic fluid is returned from the flow control valve 68 through a filter 72 and a cooler 71 to a hydraulic reservoir or tank 69. The hydraulic fluid is directed from the tank 69 to a strainer 80 and subsequently returned to the pump 67. Hydraulic pressure from the pump 67 is also directed to the hydraulic motor 11 which drives the vibratory harvester brush 39 as hereinbefore described. Fluid is returned from the hydraulic motor 11 through the filter and cooler to the hydraulic tank 69. Hydraulic pressure is also provided to the tilt hydraulic cylinder 63 through a lever controlled tilt valve 73 and is then delivered through a check valve 74 ultimately back to the reservoir 69. Hydraulic pressure is also delivered through a lever controlled elevation valve 76 to the elevation hydraulic cylinder 57. Pressure vents through a check valve 77 ultimately back to the hydraulic reservoir 69. Hydraulic pressure in turn is provided through a lever controlled brush rotation valve 78 to the brush rotation hydraulic cylinder 52, back through a check valve 79 and ultimately to the hydraulic reservoir 69. Hydraulic pressure is provided from a second pump 85 through flow control valves to the front and rear drive wheels 32 and 33 for driving and for steering the front wheel 32. The manner in which the vehicle wheels are driven or steered is not a part of the current invention and is therefore shown in FIG. 6 only for purposes of completeness. Pressure is also provided from pump 67 to a pressure control valve 90 and then to the hydraulic cylinder 65 for the purpose described in conjunction with the description of FIG. 5. Return hydraulic fluid is directed through the filter 72 and cooler 71 to the tank 69.

The preferred manner in which the tines or rods 43 are attached to the hub of the vibratory harvester brush 39 is shown in FIG. 7. The upper holding member 44 for the rods 43 is a resilient member and is split into three 120° segments. A lower metal holder 46 is provided which mates with the upper 120° segments clamping the tines or rods 43 therebetween and fixing them in radial orientation relative to the hub or shaft 28. The resilient upper holding members 44 protect the tines 43 from breaking and enhances tine flexibility. Elongate plates 81 are provided which attach to the hub alongside the shaft 28 and serve as fastening members for the upper and lower holding members 44 and 46 for the tines or rods 43. Support bars 82 run between the elongate plates 81 spaced 120° about the shaft 28 for fixing the components of the vibratory harvester brush together as an assembly.

With reference to the section of FIG. 8, a description of the structure of the brush tines 43 will now be undertaken.

The center or core of the tines 43 are called pultrusions 83. The pultrusions at the center of the section of the tine 43 shown in FIG. 8 are best fabricated as a fiberglass or a carbon fiber reinforced vinyl ester rod, wherein all the fibers are laid parallel to the length of the rod. Such construction provides light weight, higher strength and required flexibility necessary to obtain 6 to 8 inches vibration amplitude in the tines 43 at 350 to 550 cycles per minute vibration frequency. Fiberglass rod flexural strength is 120,000 PSI and the flexural modulus of such a rod is 6,000,000 PSI. Carbon fiber rod constructed as described provides flexural strength of 210,000 PSI and a flexural modulus of 18,000,000 PSI.

The frequency of oscillation for the vibratory harvester brush is critical and has been found to provide best results between 350 and 550 cycles per minute. The specific branch upon which a fruit is grown must be engaged by the tines 43 in order to get the frequency and the amplitude of oscillation to throw the fruit off of the branch. The tree structure cannot transmit this frequency and amplitude. The amplitude of the oscillation at the ends of the tines 43 has been found optimally to be equivalent to the distance between the ends of the tines at rest (6 to 8 inches). The length of the rods or tines 43 has been found to provide excellent harvesting when held at 24 inches. Eight radial rows of tines 43 were utilized in the vibratory harvester brush 39 of the preferred embodiment. Twenty-four radially disposed tines 43 were included in each of the eight rows of the preferred embodiment. Rod diameters for the pultrusions were in the range of ½ to ⅜ inch. An extruded rubber padding 84 shown in cross-section in FIG. 8 surrounds the rods 83 having a series of elongate cavities 86 running therethrough and being a little over one inch outside diameter when fit upon the rods 83. The cavities 86 running along the length of the padding member 84 provide a padded cover for the pultrusions 83 which is even more resilient than the rubber-like material from which the padding member 84 is fabricated.

The shape to which fruit bearing trees are now being pruned (FIG. 3) fulfills the purpose of establishing the fruit on the outside surface of the tree. Moreover, trees are being planted closer together in a row in a fruit orchard in further efforts to move the fruit to the outer surface of the trees by preventing sunlight from reaching the internal parts and the facing edges of the trees in the row. As a consequence, the hedgerow described hereinbefore in conjunction with FIG. 3 is envisioned as becoming common. In addition, the height of the tree is being limited in order to accommodate practical sizes of mechanical harvesters such as represented by the present invention.

It has been found that changing the tilt angle of the head relative to the tree will provide a change in the amount of fruit thrown ahead of the harvesting vehicle as well as controlling fruit removal. By reducing fruit thrown ahead, the percent of culled fruit is reduced. By adjusting the vibratory fruit harvester brush 39 tilt angle to provide a brush altitude wherein the bottom of the brush is closer to the tree than the top, there occurs an increase in fruit removal.

Although the best mode contemplated for carrying out the present invention has been shown and described herein, it will be understood that modification and variation may be made without departing from what is regarded to be the subject matter of the invention.

What is claimed:

1. A harvester for tree borne fruit wherein a wheel supported mobile vehicle has a vehicle frame and a power source for driving the vehicle along a course adjacent a row of fruit bearing trees, comprising a vibration head support frame, a support arm for supporting said vibration head support frame, means for mounting one end of said support arm for pivotal movement on the vehicle frame, a vibration head mounted on said vibration head support frame, said vibration head having an outside diameter for contacting foliage in the row of fruit bearing trees and being disposed for rotary motion about a head vibration axis, vibration head drive means mounted on said vibration head support frame and connected to the power source, a vibration means mounted on said vibration head support frame and connected between said vibration head and said vibration head drive means for driving said vibration head through an oscillatory amplitude about said head vibration axis, first power means connected between said support arm and said vibration head support frame for adjusting the attitude of said vibration head relative to vertical, second power means connected between said support arm and the vehicle frame for adjusting the position of said vibration head to assume a preferred lateral harvesting position relative to the course of the mobile vehicle adjacent the row of fruit bearing trees, third power means for changing the elevation of said vibration head relative to the vehicle frame, means for pivotally mounting said vibration head support frame on said support arm for rearward swinging movement from said preferred lateral harvesting position, hydraulic means mounted on said support arm having a hydraulically actuated movable member attached to said vibration head support frame, and adjustable means for setting a predetermined bias force to urge said hydraulically actuated movable member to position said vibration head in said preferred lateral harvesting position, whereby opposing rearward force exerted on said vibration head support frame in excess of said predetermined bias force causes rearward swinging movement of said vibration head support frame.

2. The harvester of claim 1 wherein said vibration head comprises a plurality of radially extending tines surrounding said vibration axis, a resilient cover on said tines, said resilient cover having a plurality of internal cavities therein, whereby tine resiliency is enhanced and fruit is undamaged by contact with said resilient cover.

3. The harvester of claim 1 wherein an underlying fruit catching system is associated with the harvester, further comprising a resilient substantially vertically oriented screen mounted between the wheel supported mobile vehicle and said vibration head, whereby harvested fruit directed away from the row of fruit bearing trees is deflected toward the underlying fruit catching system in undamaged condition.

4. The harvester of claim 1 wherein an underlying fruit catching system is associated with the harvester, comprising a rear substantially vertically oriented resilient screen mounted on said vibration head support frame between the wheel supported mobile vehicle and said vibration head, and a forward substantially vertically oriented resilient screen mounted on said support arm in a position between the vehicle and said vibration head, whereby harvested fruit directed away from the row of fruit bearing trees is deflected toward the underlying fruit catching system in undamaged condition.

5. A harvester for tree borne fruit wherein a mobile vehicle having a vehicle frame supported by a plurality of ground contacting wheels is driven by a power source along a harvesting path adjacent a fruit bearing tree, comprising a vibration head support frame, a support arm for supporting said vibration head support frame, said support arm being pivotally connected to said vibration head support frame at one end, means for mounting an opposing end of said support arm for pivotal movement on the vehicle frame, a vibration head mounted on said vibration head support frame, vibration inducing means mounted on said vibration head support frame connected between the power source and said vibration head, first power means mounted on the vehicle frame, said first power means having a first movable member connected to said support arm for pivoting said support arm from a position trailing the mobile vehicle to a position orthogonal to the harvesting path, second power means mounted on said support arm, said second power means having a second movable member connected to said vibration head support frame for tilting said vibration head support frame, and third power means mounted on said means for mounting an opposing end of said support arm, said third power means having a third movable member connected to an intermediate position along said support arm for changing the elevation of said vibration head.

6. The harvester of claim 5 wherein said vibration head comprises a plurality of radially extending tines surrounding said vibration axis, resilient cover means surrounding each of said plurality of radially extending tines, said resilient cover means having a plurality of internal cavities therein, whereby tine surface resiliency is enhanced and fruit contacted thereby is undamaged.

7. The harvester of claim 5 having an underlying fruit catching system associated therewith, further comprising a substantially vertically oriented resilient screen mounted between the mobile vehicle and said vibration head, whereby harvested fruit directed away from the fruit bearing tree is deflected by said resilient screen toward the underlying fruit catching system without damaging the fruit.

8. The harvester of claim 5 comprising pivot means having a substantially vertical pivot axis mounted between said support arm and said vibration head support frame, hydraulic means mounted between said vibration head support frame and said support arm for resisting rearward swinging movement of said vibration head support frame about said pivot means relative to the vehicle frame, and adjustable means for providing a predetermined bias force to said hydraulic means to maintain said vibration head support frame in a forward harvesting position relative to the vehicle frame, whereby opposing rearward force exerted on said vibration head in excess of said predetermined bias force causes rearward swinging movement of said vibration head support frame.

9. The harvester of claim 8 wherein an underlying fruit catching system is associated with the harvester, further comprising a rear substantially vertically oriented resilient deflection screen mounted on said vibration head support frame between the mobile vehicle and said vibration head, and a forward substantially vertically oriented resilient deflection screen mounted on said support arm between the mobile vehicle and said vibration head, whereby harvested fruit directed forward of, rearward of and toward the mobile vehicle is deflected toward the underlying fruit catching system in undamaged condition.

10. A vibratory fruit harvesting apparatus for mounting on a support vehicle for removing harvestable fruit from plant foliage, comprising a vibration head having a rotation axis, a vibration head support frame for mounting said vibration head, vibration drive means connected to said vibration head for inducing oscillatory motion in said vibration head about said rotation axis, a plurality of solid flexible pultrusions extending substantially radially from said rotation axis for intrusion into the plant foliage, hub means for securing said plurality of pultrusions in position about said rotation axis, and a resilient cover lying along the length of each of said plurality of pultrusions, said resilient cover having a plurality of cavities therewithin, whereby said resilient covers make yielding contact with the harvestable fruit.

11. The vibratory fruit harvesting apparatus of claim 6, comprising means for pivotally mounting said vibration head support frame for a rearward swinging movement from a preferred lateral harvesting position relative to the support vehicle, and hydraulic means for providing an adjustable bias force to maintain said vibration head support frame in said preferred lateral harvesting position, whereby excess force on said vibration head opposing said adjustable bias force produces said vibration head support frame rearward swinging movement.

12. The vibratory fruit harvesting apparatus of claim 10, wherein said hub means comprises a resilient gripping member for said plurality of pultrusions, whereby pultrusion flexibility is enhanced.

13. The vibratory fruit harvesting apparatus of claim 11, comprising, means for adjusting the tilt angle of said rotation axis relative to vertical.

14. The vibratory fruit harvesting apparatus of claim 13, comprising means for adjusting the height of said vibration head, and means for adjusting said preferred lateral harvesting position of said vibration head relative to the support vehicle.

\* \* \* \* \*